Feb. 5, 1957  J. PERRELLI  2,780,367
APPARATUS FOR STACKING DISCRETE ARTICLES
Filed Dec. 8, 1952
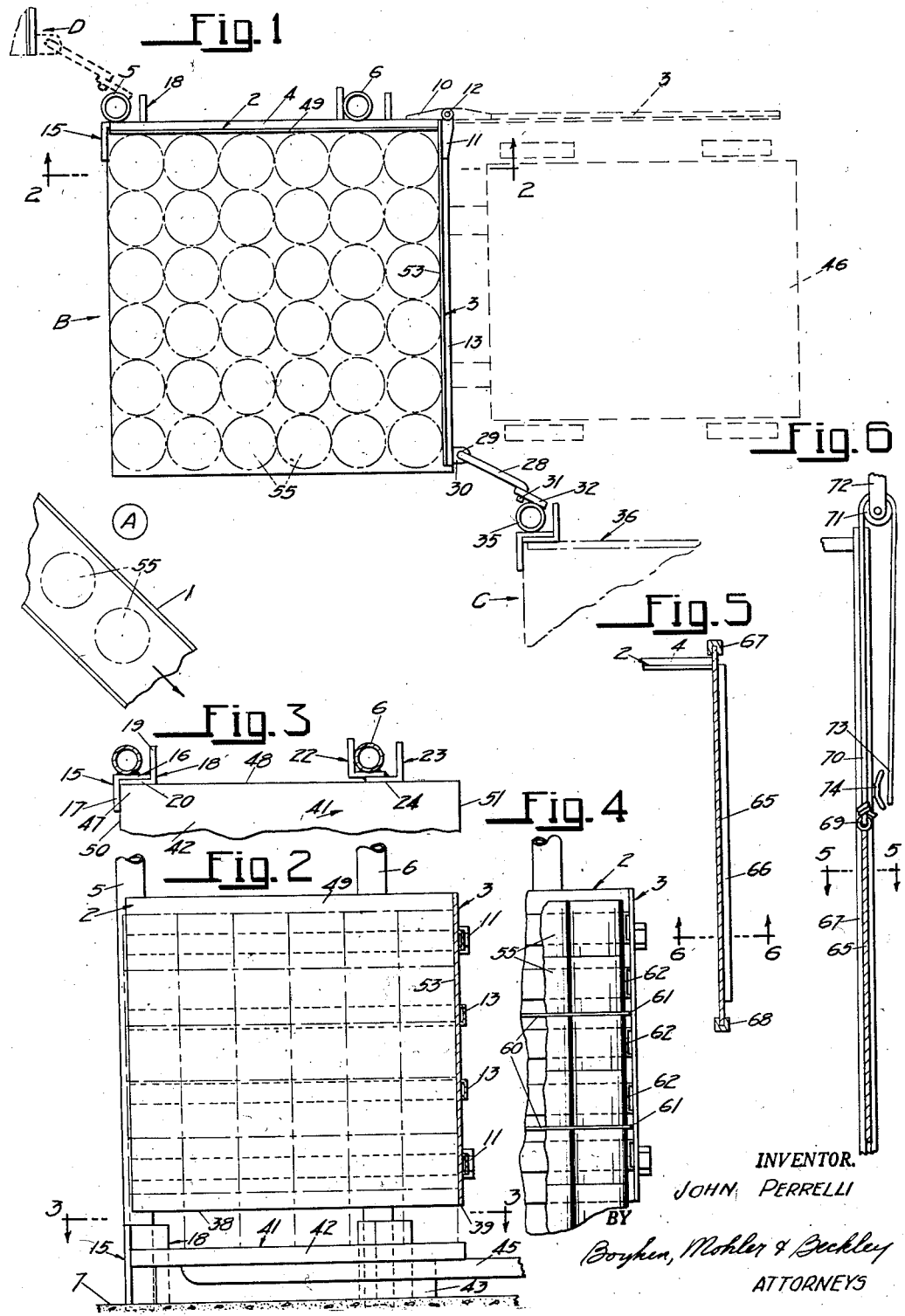
INVENTOR.
JOHN PERRELLI
BY
Boyken, Mohler & Beckley
ATTORNEYS United States Patent Office 2,780,367
Patented Feb. 5, 1957

2,780,367

APPARATUS FOR STACKING DISCRETE ARTICLES

John Perrelli, Richmond, Calif.

Application December 8, 1952, Serial No. 324,656

2 Claims. (Cl. 214—10.5)

This invention relates to apparatus for use in facilitating the handling and stacking of discrete articles and more particularly to apparatus which may be employed to form a stack of articles such as packages, cans and the like on a pallet for subsequent transportion of the pallet with the stack of articles thereon.

In most canning and packaging plants it is usually necessary at some point in the production system to stack a load of cans or packages on a pallet so that the same may be transported by a fork lift truck or the like to another portion of the plant. This usually requires the removal of the cans or packages from a conveyor line at a station adjacent which a pallet is adapted to be positioned and on which the operator may stack the cans or packages in a plurality of tiers of horizontally extending rows.

In the case of cylindrical cans, the procedure of stacking the cans on pallets is an exacting one especially if a relatively large number of tiers of cans are to be formed because of the ever present tendency of the cans to topple over. This slows down the operator and in some instances requires the use of extra operators in order to keep up with the rate at which the cans are being brought to the stacking station.

The above procedure may be simplified by establishing a structure having one or more vertically disposed sidewalls against which the cans may be stacked with such sidewalls acting as back stops. However, in such a case the problem of getting the fork truck, with the pallet thereon, in and out of the area defined by such sidewalls becomes a major one because the truck would obviously have to be driven through the station at which the stacking operator is positioned thus disrupting the smooth operation of the can transfer procedure to say nothing of the danger to the operator present at the station. If the pallet is positioned far enough away from the conveyor from which the cans are received so as to reduce the amount of possible interference, the operator who stacks the cans then has further to walk with his loads thus reducing his efficiency and increasing the effort required.

The main object of the present invention is the provision of an extremely simple and inexpensive apparatus for use in the above described operation and which apparatus permits the accomplishing of the stacking and transporting procedures above described with no interference on the part of the various operators involved.

Another object of the present invention is the provision of apparatus for stacking a large quantity of discrete objects such as cans and packages in a plurality of tiers in an extremely safe manner without any danger of such objects toppling over and being damaged.

Still another object of invention is the provision of apparatus for stacking articles such as cans and packages on pallets and which apparatus permits the pallets to be transported more quickly than heretofore possible.

Other objects and advantages of the invention will be apparent from the following specification and from the drawings wherein:

Fig. 1 is a top plan view of the apparatus of the present invention with the supporting stanchions in section and showing schematically a fork lift truck, a loaded pallet and a conveyor all in their proper relative positions.

Fig. 2 is a vertical cross-sectional view of the apparatus as taken along lines 2—2 of Fig. 1.

Fig. 3 is a horizontal cross-sectional view through the stanchions as taken along lines 3—3 of Fig. 2.

Fig. 4 is a vertical cross-sectional view through a portion of a modified form of the apparatus of Fig. 2 and showing a plurality of stacked cans.

Fig. 5 is a horizontal cross-sectional view through the movable sidewall showing a modified form of the means for supporting said sidewall.

Fig. 6 is a vertical cross-sectional view through the movable sidewall of Fig. 5 showing the means for moving the same.

In detail the apparatus is adapted to be installed at any convenient point in a plant relative to a conveyor generally designated 1 (Fig. 1) or any other means by which the articles to be stacked are brought to a transfer station such as is schematically indicated at "A" in Fig. 1.

Adjacent said station A and on the side of the latter opposite said conveyor 1 are a pair of vertically disposed sidewalls generally designated 2, 3.

Sidewall 2 preferably comprises a generally rectangular plate of sheet steel or the like angularly disposed relative to conveyor 1 as shown in Fig. 1.

On the side of sidewall 2 which is directed away from conveyor 1 the same is provided with a plurality of vertically spaced, horizontally extending stiffeners 4 which serve to stiffen the sidewall 2 and which are secured as by welding at points adjacent their ends to vertically extending stanchions 5, 6 respectively. Stanchions 5, 6, which may be steel pipe, are fixedly secured at their lower ends to a supporting surface 7 such as a concrete floor (Fig. 2).

Sidewall 3 is preferably disposed at right angles to sidewall 2 and in intersecting relation therewith. At vertically spaced points along the adjacent edges of sidewalls 2, 3 the same are provided with hinge leaves 10, 11 respectively and hinge pins 12 for swingably supporting sidewall 3 relative to the fixed sidewall 2. As best seen in Fig. 1, sidewall 3 may thus be swung about a vertical axis coinciding with hinge pins 12 from a full line position in which it is at right angles to sidewall 2 to the dotted line position substantially coplanar with side wall 2. Sidewall 3 may be stiffened in like manner as sidewall 2 by stiffeners 13.

At the lower end of pipe stanchion 5 an angle 15 is rigidly secured thereto with one leg 16 parallel to sidewall 2 and with its other leg at right angles to said sidewall. Alongside leg 16 of angle 15 is positioned one leg 20 of a similar angle 18 so that the other leg 19 of angle 18 is directed parallel to leg 17 of angle 15 but in the opposite direction (Fig. 3). By this structure it will be seen that a right angle corner is formed by leg 17 of angle 15 and leg 20 of angle 18 for a purpose to be described.

Pipe stanchion 6 is provided at its lower end with a pair of angles 22, 23 which are rigidly secured together to form a channel with the bottom of the channel rigidly secured to stanchion 6 and with a side of one leg of angle 23 providing a face 24 in horizontal alignment with the corresponding face of leg 20 of angle 18 (Fig. 3).

Sidewall 3 is releasably secured in a position at right angles to sidewall 2 by means of a latch bar 28 which is provideded at one end with a down turned portion adapted to be received in an upwardly opening hole 29 in a socket member 30 (Fig. 1).

The opposite end of latch bar 28 is provided with a horizontally extending portion 31 which is swingably supported in a complementarily formed opening in a member 32. Member 32 may be rigidly secured to any suitable fixed structure but is conveniently attached to a pipe stanchion 35 corresponding to pipe stanchion 5 and being a part of another structure similar to that described above and which includes a fixed sidewall 36 (Fig. 1).

Sidewalls 2, 3 are preferably positioned so that their lower edges 38, 39 respectively (Fig. 2) are spaced a substantial distance above the supporting surface 7 on which the structure is supported. The angles 15, 18, 22, 23 may extend upwardly from supporting surface 7 and terminate adjacent said lower edges 38, 39 of sidewalls 2, 3.

By the above described arrangement an opening is formed between the lower edge 39 of the movable sidewall 3 through which a conventional pallet, generally designated 41, may be passed. Such a pallet generally includes a horizontally extending rectangular platform 42 and two or more stringers 43 rigid with said platform for spacing the latter above the supporting surface 7 (Fig. 2).

Pallet 41 is adapted to be engaged along the underside of platform 42 by the forks 45 of a fork-lift truck 46 indicated by dotted lines in Fig. 1. Thus, pallet such as that illustrated may be carried by said truck 46 and, while resting on forks 45, be passed under sidewall 3 to the position shown in Figs. 1 and 2. This operation may be performed while said sidewall 3 is in its closed position, that is, at right angles to sidewall 3 and with the latch bar 28 engaged with socket 30.

While the pallet 41 is still resting on forks 45 the truck 46 may be moved as desired so that one corner 47 of platform 42 of pallet 41 is engaged with leg 17 of angle 15 (Fig. 3) and leg 20 of angle 18. At the same time the lateral side edge 48 of platform 42 may be made to abut the face 24 of angle 23 on pipe stanchion 6. A simple and effective means is thus provided for positioning pallet 41 so that its side edge 48 is perpendicular to movable sidewall 3 parallel to sidewall 2.

The combined thickness of the connected legs of angles 15, 18 and of angles 22, 23 should not be greater than the thickness of stiffeners 4 by which the fixed sidewall 2 is spaced from pipe stanchions 5, 6, and preferably less, so that edge 48 of pallet 42 is between the plane of the inner side 49 of sidewall 2 and the pipe stanchions 5, 6.

In like manner, the distance between leg 17 of angle 15 and movable sidewall 3 when the latter is in closed position should be slightly less than the width of the platform 42 between side edges 50, 51 (Fig. 3) so that edge 51 projects outwardly beyond the inner side 53 of movable sidewall 3.

In operation, the pallet 41 is positioned in the area defined by sidewalls 2, 3 with the edge 50 of said pallet abutting the leg 17 of angle 15, and with side edge 48 against leg 20 of angle 18 and face 24 of angle 23. The operator may then transfer the articles 55 by any convenient method from conveyor 1 on which they are moving to the pallet 41.

The presence of sidewalls 2 and 3 greatly facilitates the stacking operation as the cans, or whatever other articles are involved may be placed against said sidewalls with the latter acting as back stops. The stacking procedure is preferably carried out by stacking articles in perpendicularly extending horizontal rows starting from rows formed adjacent sidewalls 2, 3 and proceeding toward the corner of the pallet adjacent station A. It will be apparent that this method obviates any tendency of the cans to topple and the stacking may be done very rapidly.

When the articles have been stacked in the desired number of tiers the movable sidewall 3 is released by disconnecting latch bar 28 thus permitting the sidewall 3 to be swung horizontally on hinges 11, 12 to the dotted line position of Fig. 1.

The fork lift truck may then be driven to the position shown in dotted lines in Fig. 1 with the forks 45 engaging the underside of platform 42 of pallet 41. The pallet with the load thereon may then be removed in direction at right angle to the plane of sidewall 3 when the latter is in closed position.

It should be noted that such an operation in no way interferes with the operator stationed at station A, which would otherwise be the case if the load had to be removed from the side adjacent the conveyor. Furthermore it will be noted that the pallet 41 may be positioned closer to the conveyor than would be possible if clearance had to be provided adjacent the conveyor for truck 46.

In stacking some objects such as cans which are less stable than rectangular articles, it is preferable to provide a layer of semi-rigid sheet material such as cardboard between each tier or between each two tiers. Such a layer of material permits a greater number of tiers to be stacked because the inherent instability of each vertically extending row of cans is reduced.

To insure optimum advantage from such a sheet of cardboard it is conventional practice to permit the latter to overhang the outermost rows of cans as best seen in Fig. 4 wherein sheets 60 of cardboard are placed on top of each two tiers of cans 55 with a relatively narrow marginal portion 61 of each sheet 60 overhanging the outermost row of cans of the stack.

In such a case it is preferable to secure horizontally extending stiffeners 62 to the inside face of both the fixed and movable sidewalls as seen in the modified form of movable sidewall 3 in Fig. 4. Fixed sidewall 2 would, of course, be modified in the same manner so that the marginal portions 61 of sheet 60 may extend between each stiffener 62 with the outer faces of all the stiffeners defining the surface against which the cans are stacked.

In Figs. 5 and 6 is shown an alternative means for moving the movable sidewall designated 65. In this case the fixed sidewall 2 may be the same as above described except that it is not provided with hinge leaves. The movable sidewall 65 is provided with stiffeners 66 on the outside surface of said sidewall and is slidably supported at its vertically extending marginal edges in fixed channels 67, 68 respectively for vertical movement therealong.

Centrally of the upper edge of sidewall 65 is secured eye 69 (Fig. 6) to which one end of a rope 70 is fastened. Rope 70 extends upwardly from said eye and is passed over a sheave 71 which in turn may be supported by any convenient hanger 72 (Fig. 6). By pulling on the free end 73 of rope 70 the sidewall 65 may be raised from the closed position shown in Figs. 5 and 6 to a position in which the lower edge of said sidewall is above the uppermost article of the stack. The rope 70 may then be fastened to any suitable fixture such as cleat 74 on channel 67 and the loaded pallet withdrawn as above described.

Although the form of invention shown in Figs. 1–4 is preferred when space is available for swinging the movable sidewall 3, the modified form shown in Figs. 5, 6, is particularly desirable when a saving in working space is desired.

It will be apparent that more than one unit of the apparatus may be aligned alongside conveyor 1. The above described apparatus, designated "B" in Fig. 1 may be duplicated on opposite sides of the same so as to provide additional apparatus C and D identical to that already described. In this manner the articles may be taken from the conveyor 1 at different points along the length of said conveyor and stacked in the same manner as above described. When one pallet is loaded it may be readily removed by the fork truck operator in the manner above described without interfering with any of the stacking operations.

As seen in Fig. 1, the post 35 is identical with post 5 in structure and in function, i. e., it rigidly supports one end of one of the walls of each stacking unit B and C, and at the same time it is provided with means for releasably connecting wall 2, or 36 with the movable wall 3 of unit B or with the movable wall of unit D. Thus, in a row of these stacking units, the posts 5, 35, etc. which are identical with each other, would cooperate with posts 6 in each unit to hold the adjacent walls (such as 3, 36 and the corresponding wall of unit D) in positions disposed in vertical planes at right angles to each other to form a zig-zag row of walls forming re-entrant angles along one side of said row for a pallet and a stack of cans therein, and re-entrant angles along the opposite side of the row for the entry of vehicles to positions at right angles to alternate of said walls for removing the pallets and their loads from said opposite side with said alternate walls movably mounted to move to positions permitting the lateral movement of said pallets and their loads across the plane occupied by said alternate walls before their movement to said positions.

In this manner, loading of the pallets, from one side of the row of zig-zag walls is unobstructed and the activities of the operator or operators at said one side cannot possibly meet with interference by the trucks that carry the loaded pallets away.

By supporting the movable walls spaced above the floor a greater height than the vertical height of the pallets, the positioning of the empty pallets will not meet with interference from the trucks and the provision of right angle re-entrant angles by two of the walls from adjacent pairs of units (in which one of the walls is rigid) guards the truck against interference from the side of the rigid wall, and where the movable wall 3 is swung to the broken line position shown in Fig. 1. This wall coacts with rigid wall 36 of the unit C, adjacent to unit B to form a guide passageway extending directly at right angles to the loaded stack in unit B for the truck 46, as seen in Fig. 1, which walls 3, 36 or the corresponding walls on units D and B or other adjacent pairs of units in a row, enable the driver to quickly and properly align the truck with the load to be picked up.

The stanchions 5, 35 are, of course, common to a rigid and movable wall in an adjacent pair of stacking units.

The provision of a conveyor extending along the can loading side of the row of zig-zag walls virtually constitutes the third side of the open space between the rectangular packing areas outlined by the pallets, and in which areas the operators are positioned and are protected on all sides from interference by trucks and the like. Each of these areas for the operators are generally triangular with adjacent pallets defining two sides and the conveyor the third side as seen in Fig. 1.

While each individual stacking unit is believed to be novel in itself, there is a definite coaction between a plurality of such units and the conveyor in providing an efficient system that provides for faster work by the operators with far more safety than heretofore.

This combination and arrangement can briefly be described as being a plurality of pairs of vertical walls arranged in a zig-zag row with the adjacent pairs of walls in the row disposed at right angles to each other so that said walls define re-entrant angles along opposite sides of the row. The re-entrant angles formed by said walls along one side of said row each define two sides of a rectangular area adapted to receive a rectangular loading pallet therein with the edges of the pallet parallel with and along each of said two sides, while the re-entrant angles formed by each pair of adjacent walls along the opposite side of said row define two sides of a recess into which a left truck is adopted to be driven in a direction perpendicular to one wall of each adjacent pair of said walls, and directly to the vertical plane occupied by such one wall. This one wall is swingable to spaced, parallel, opposed position relative to the other wall with which it formed a re-entrant angle at the side of the row opposite the stacking areas so as to coact with said other wall to provide a passageway to the stack and to said vertical plane. Fig. 1 clearly shows such passageway between the broken line wall 36 and the broken line position of wall 3.

The detailed description of the apparatus herein given is not to be taken as restrictive of the invention as it is obvious that minor variations in design may be effected without departing from the spirit of the invention.

I claim:

1. In combination with a horizontal floor adapted to support a vehicle, a pair of stacking structures for use in forming and handling stacks of discrete articles with adjacent lateral sides of each stack being formed by tiers of horizontally extending pairs of perpendicularly intersecting rows of said articles, each of said structures comprising: a pair of vertically disposed sidewalls at right angles to each other and in intersecting relation to define two of the sides of a rectangular area adapted to receive an article support resting on said floor, means securing one of said sidewalls rigid with said floor, means swingably securing the other of said sidewalls to said one sidewall for swinging said other sidewall outwardly from said area to a position substantially coplanar with said one sidewall, means for releasably securing said other sidewall at right angles to said first sidewall, the means for fixedly securing the fixed sidewall of one of said pair of structures including a stanchion secured at its lower end to said floor and the means for releasably securing the swingable sidewall of the other of said pair of structures including a fastening element releasably secured to said stanchion.

2. Apparatus for use in forming stacks of cans and for handling such stacks and supports therefor, comprising: a plurality of vertical walls in zig-zag arrangement with the walls of adjacent pairs being at right angles to each other and in a row defining the sides of a plurality of first laterally opening re-entrant angles at one side of said row and a second laterally opening re-entrant angle at the other side of said row, the adjacent pairs of walls defining said first laterally opening re-entrant angles each being adapted to receive a horizontal rectangular loading pallet within the re-entrant angle formed by each pair with two adjacent edges of said pallet parallel with and alongside the walls of each such pair at their lower ends, the pair of walls forming the sides of said second re-entrant angle including one wall from each of the adjacent pairs of walls that form the sides of an adjacent pair of first re-entrant angles, the adjacent pair of walls defining the sides of said second re-entrant angle being adapted to receive a lift truck therein squarely facing one wall of the adjacent pair thereof forming the sides of said second re-entrant angle, means pivotally supporting said one wall along its vertical edge that is remote from the adjacent edges of the pair of walls defining the sides of said second re-entrant angle for swinging said one wall to an open position in spaced, parallel opposed relation to the other wall forming the other side of said first re-entrant angle whereby said other wall and said one wall will provide the opposite sides of a passageway admitting such lift truck to a pallet and its load positioned in one of said adjacent pair of first re-entrant angles for moving said pallet and its load through said passageway and across the vertical plane occupied by said one wall before movement thereof to said open position, means for releasably connecting the edge of said one wall that is opposite to its pivotally supported edge for connecting said one wall with the other wall forming the other side of said second re-entrant angle for holding said one wall and said other wall in right angle relationship.

References Cited in the file of this patent

UNITED STATES PATENTS

| | | |
|---|---|---|
| 799,941 | Rivers | Sept. 19, 1905 |
| 1,121,658 | Penfield | Dec. 22, 1914 |
| 2,333,479 | Graf | Nov. 2, 1943 |
| 2,338,048 | Minaker et al. | Dec. 28, 1943 |
| 2,503,562 | Porter | Apr. 11, 1950 |
| 2,605,910 | Kovatch | Aug. 5, 1952 |